United States Patent

[11] 3,568,744

| [72] | Inventors | Keijiro Sakashita<br>Matsudo;<br>Shigenori Enokida, Tokyo, Japan |
|---|---|---|
| [21] | Appl. No. | 794,069 |
| [22] | Filed | Jan. 27, 1969 |
| [45] | Patented | Mar. 9, 1971 |
| [73] | Assignee | Cashew Co., Ltd.<br>Tokyo, Japan |

[54] MACHINE FOR AUTOMATICALLY REMOVING ASTRINGENT SKINS OF PEANUTS
1 Claim, 8 Drawing Figs.

| [52] | U.S. Cl. | 146/32 |
|---|---|---|
| [51] | Int. Cl. | A23n 5/10 |
| [50] | Field of Search | 146/32, 49, 308, 306, 8-H |

[56] References Cited
UNITED STATES PATENTS

| 1,458,695 | 6/1923 | Frank et al. | 146/32 |
| 1,574,138 | 2/1926 | Vaughan | 146/8 |
| 2,574,761 | 11/1951 | Rutherford | 146/51X |
| 2,693,833 | 11/1954 | Drutt | 146/32 |

*Primary Examiner*—Willie G. Abercrombie
*Attorney*—Wenderoth, Lind & Ponack

ABSTRACT: The present invention relates to a machine for automatically removing astringent skins of peanuts which comprises a transferable peeling board having a wire netting provided with edge tools and containers having openings on the bottom forwarded onto said board and retained at regular intervals thereon, automatically removing astringent skins only from kernels of peanuts accommodated in said containers by said peeling board.

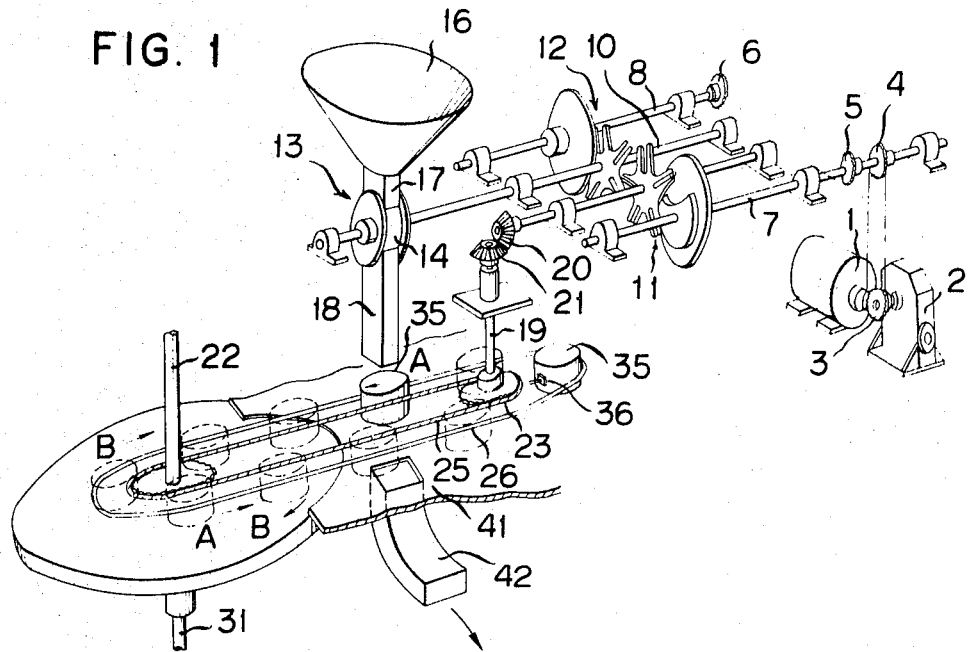
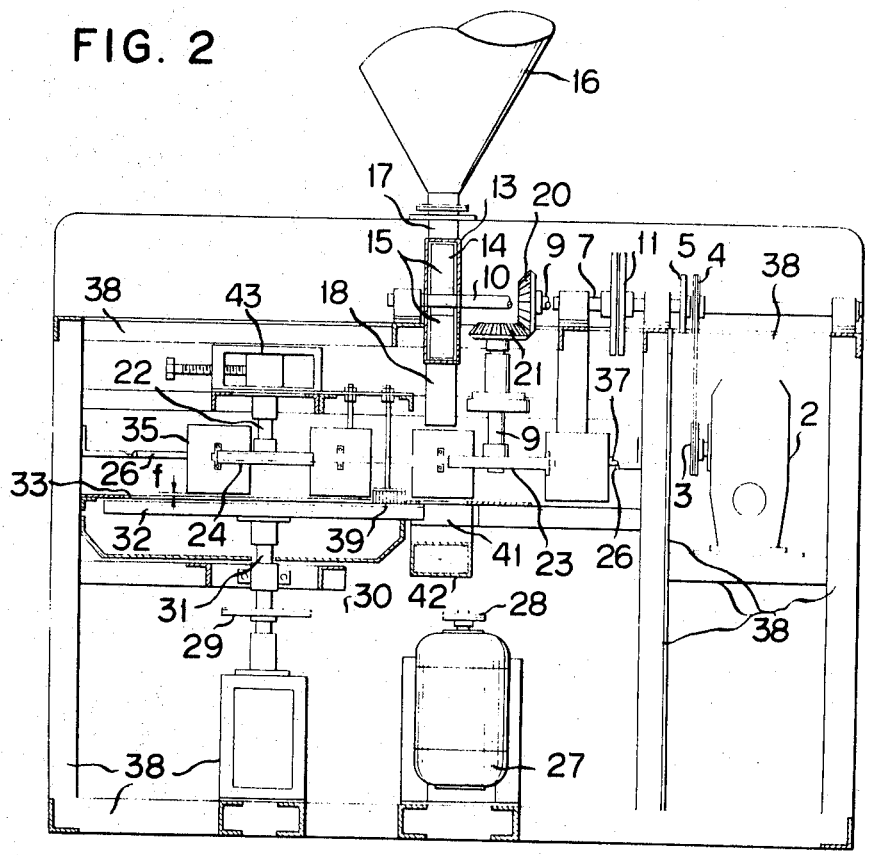

KEIJIRO SAKASHITA &
SHIGENORI ENOKIDA,
INVENTORS

BY Wenderoth, Lind & Ponack
Attorneys

3,568,744

MACHINE FOR AUTOMATICALLY REMOVING ASTRINGENT SKINS OF PEANUTS

The present invention relates to an improvement of a machine for automatically removing astringent skin of peanuts.

Heretofore, as a process for automatically removing astringent skins of peanuts, the following processes have been known. Namely, kernels adhered with astringent skins are immersed in heated water, thereafter, breaks are imparted to the astringent skins by an edged tool, further, the kernels adhered with the astringent skins are forwarded one by one in between two rubber rolls having different relative speeds to be rubbed to thereby remove the astringent skins from the kernels. Alternatively kernels adhered with astringent skins are heated and dried in a parching vessel, and thereafter the kernels adhered with the astringent skins are forwarded in between two rubber rolls having different relative speeds to be rubbed to thereby remove the astringent skins from the kernels. In the former process, however, there are deficiencies in that tannin of the astringent skins is dissolved in the heated water and adheres to the kernels to discolor the same. On the other hand, the surfaces of the kernels are hardened by immersion in the heated water and lose flavor. In both of the above two processes, because the kernels are rubbed between two rubber rolls having different relative speeds, there is the disadvantage that the kernels are broken, and moreover, because the kernels are forwarded one by one in between the rubber rolls, there is the additional disadvantage of a low treating capacity.

The present invention is proposed in view of these disadvantages. The principal object of the present invention is to provide a novel machine for automatically removing astringent skins of peanuts, achieving removal of the skins without causing a change in quality and discoloration of the kernels.

Another object of the present invention is to provide a novel machine for automatically removing skins of peanuts, achieving removal of skins without causing destruction of the kernels.

A further object of the present invention is to provide a novel machine for automatically removing astringent skins of peanuts capable of immediately separating the astringent skins after they are removed so that the astringent skins may not again adhere to the kernels.

A still further object of the present invention is to provide a novel machine for automatically removing astringent skins of peanuts of a simple structure having a remarkably high treating capacity.

In order to achieve the aforementioned objects, the present invention comprises a peeling board provided with a wire netting having at a proper place on the upper part of each wire edge tools and containers having openings on the bottoms forwarded onto said board and retained thereon at regular intervals.

Because the present invention comprises, as mentioned above, a peeling board provided with a wire netting having edge tools at proper places on the upper part of each wire in case the machine is so constituted as to rotate the peeling board, when the container proceeds onto said peeling board, of the kernels adhered with astringent skins accommodated in said container, the lower part directly contacts said peeling board. The wire netting forwards the entire kernels of said lower part in the direction of transfer of said peeling board within the container, and the head of said lower part is elevated along the internal sidewall of said container, e.g. a cylindrical container. On the other hand, the back of said lower part lowers the upper part, thus causing a convection motion as a whole. Moreover, in this case because the velocity of the wire netting is larger at the outer side, the convection motion in said cylindrical container is faster at the outer side, and as a result, the kernels reaching the upper part are forwarded thereafter in a direction diagonal to the front. Accordingly, inside said cylindrical container passing on said peeling board, all the kernels are stirred at a fast speed to contact the entire surface of each kernel to the wire netting. To the astringent skin of each kernel upon contact with the wire netting said edging tools contact one after another to remove the astringent skin from the kernel. The astringent skins remaining on the kernels having passed on the wire netting are completely removed by the scratching of each kernel transferring to the upper side or by cutting by the edge tools when they come down again. The astringent skins removed from the kernels transfer together with the rotating wire netting and are vigorously exhausted in the direction of rotation of the wire netting from the gap between the board and the cylindrical container.

As such, because the present invention stirs the kernels inside a container, for instance a cylindrical container provided on a peeling board in the form of a wire netting rotating at a high speed, removes the astringent skins by edge tools provided on the peeling board, and exhausts the astringent skins removed from the kernels from the gap between the peeling board and said container, the structure is simplified, removal of the astringent skins is carried out quickly and the treating capacity is remarkably increased. Again, because the kernels adhered with the astringent skins to be poured onto said container do not have to be pretreated such as by immersion in heated water, discoloration or change of quality of the kernels does not take place, moreover, because the kernels only contact the wire netting, they are not broken and good quality products are obtained.

Other advantages and novel characteristics of the present invention will be made clear by the following description taken together with the accompanying drawings.

In the drawings:

FIG. 1 is a perspective view showing one embodiment of the machine for automatically removing astringent skins of peanuts according to the present invention.

FIG. 2 is a side elevation of said machine for automatically removing astringent skins of peanuts.

Figure 3:
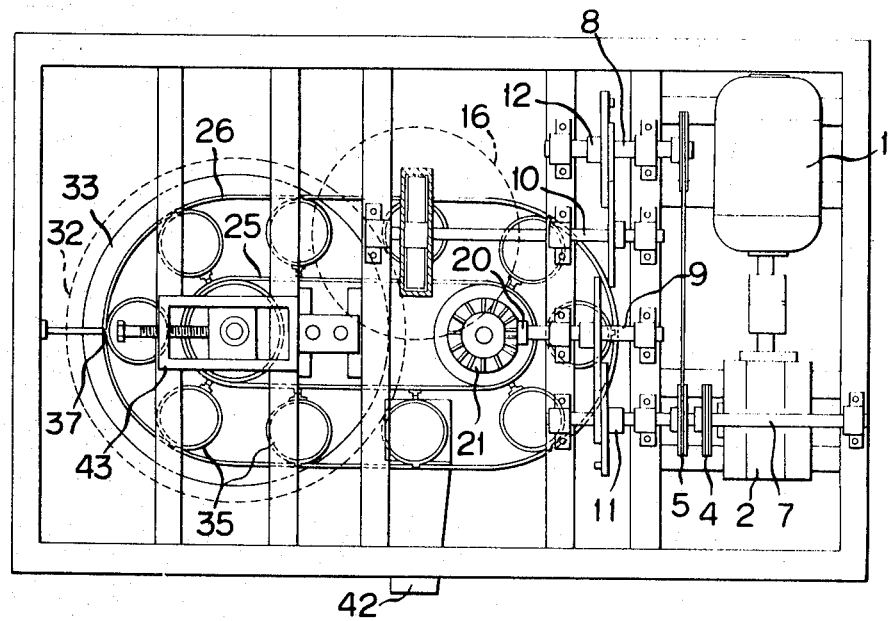
FIG. 3 is a plan view of said machine for automatically removing astringent skins of peanuts.
Figure 4:
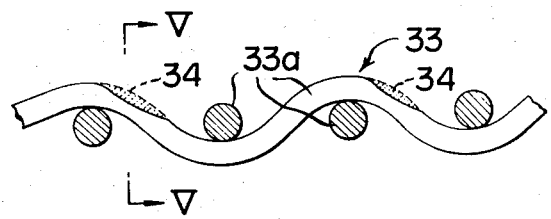
FIG. 4 is an enlarged side elevation in longitudinal section showing a part of the rotating disc of said machine for automatically removing astringent skins of peanuts.
Figure 5:
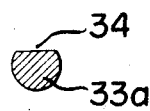
FIG. 5 is a side elevation in longitudinal section taken along line V–V of FIG. 4.

When the present invention is explained in more detail while referring to FIGS. 1—8, 1 is a motor, 2 is a decelevator, 3, 4, 5 and 6 are chain wheels, 7 and 8 are driving shafts, 9 and 10 are subordinate shafts via timing cams 11, 12; 13 is a material feed device, 14 is a box of the feed device 13, which is penetrated by one end of said subordinate shaft 10. On the subordinate shaft 10 located inside the box 14, are provided a plurality of radical partitions 15, and between the same and the box 14, a constant quantity of accommodating chambers a, b, c, d and e are formed. By one intermittent driving of the driving shaft 10, the material in a predetermined amount is fed from a hopper 16 to a cylindrical container of which mention will be made later. In the position shown in the drawings, the accommodating chambers e, a communicate with a passage on the feed side 17, the material is fed to said accommodating chambers e, a. On the other hand, the accommodating chamber c communicates with a passage on the discharge side 18 and a predetermined amount of the material is discharged to the cylindrical container of which mention will be made later. Subsequent intermittent driving feeds the material into the accommodating chamber d, which then discharges the material inside the accommodating chamber c to the passage on the discharge side 18. 19 is a rotating shaft moving in association with said subordinate shaft 9 via bevel gears 20, 21; 23, 24 are chain wheels mounted on said driving shafts 19, 22; 25 is a chain provided between these chain wheels 23, 24; 26 is an endless guide rod fixed on the outer periphery of said chain 25; 27 is a motor, 28, 29 are pulleys, 30 is a belt provided between these pulleys 28, 29; 31 is a rotating shaft, 32 is an annular frame integral with said rotating shaft 31; 33 is a wire netting provided on said frame 32 and by said frame 32 and said wire netting 33, a peeling board is constituted. At proper places on the upper side of each wire 33a constituting said wire netting 33, as shown in FIG. 4 and FIG. 5 edge tools 34 are provided in cutoff forms.

35 is a cylindrical container having openings on the upper part and the lower part and connected to said chain 25 by means of a connecting tool 36, and a supporting piece 37 provided on said container (cf. FIG. 2 and FIG. 3) slidably moves on said guide rod 26. Accordingly, said container 35 drives intermittently in the direction of an arrow A inside said guide rod 26 by intermittent driving of said chain 25. And when said cylindrical container proceeds on said wire netting 33, as shown in FIG. 2, a predetermined gap $f$ is formed.

In the drawings, 38 is a frame, 39 is a cleaning brush pressed onto said wire netting 33 via a spring 40; 41 is a receiving plate, 42 is a discharge passage extending from said receiving plate 41 and 43 is a tensioning device for a chain.

Figure 6:
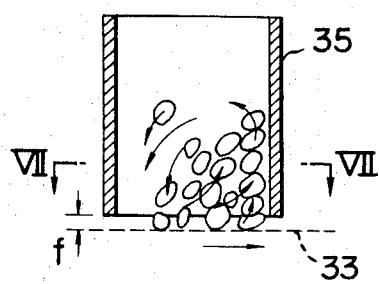
FIG. 6 and FIG. 7 are schematic views showing functional situations of said machine for automatically removing astringent skins of peanuts.
Figure 7:
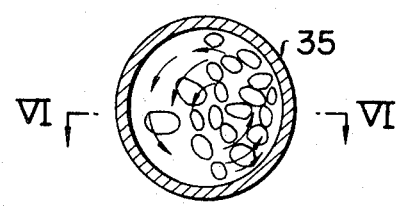
Figure 8:
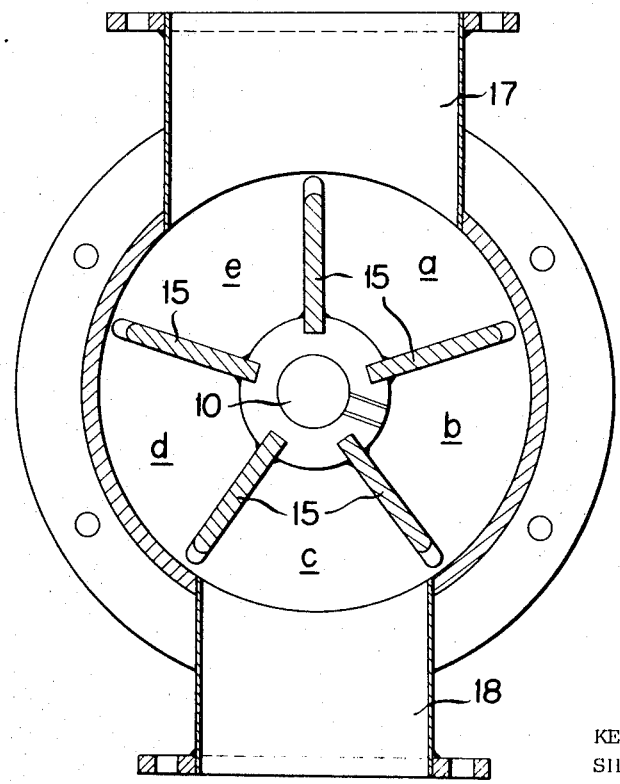
FIG. 8 is a side elevation in longitudinal section of a peanut feed device additionally provided in said machine for automatically removing astringent skins of peanuts.

In the illustrated apparatus, when an empty cylindrical container 35 is positioned below the material feed device 13, it stops, and at the same time, the feed device 13 operates. Therefore, a predetermined amount of kernels adhered with astringent skins are fed to the container. By subsequent intermittent driving, said container proceeds onto a disclike wire netting 33 and subsequent intermittent driving proceeds or stops said cylindrical container on said netting 33. Moreover, because the wire netting 33 located thereunder rotates at a high speed in a direction of an arrow B, within said cylindrical container the following motions are carried out. Namely, of the kernels adhered with astringent skins accommodated inside said container, the lower part directly contacts the wire netting rotating at a high speed, forwarding all of the kernels within the lower part in the direction of rotation of the wire netting. Simultaneously, the head of the lower part is elevated along the internal sidewall of the container 35, while on the other hand, the upper part is lowered to the back of the lower part thereby causing a convection movement of the entire quantity of kernels as shown in FIG. 6. In addition, because velocity of the wire netting is faster at the outer part of the wire netting, said convection movement inside the cylindrical container is faster at the outer part, as a result the kernels in the upper part are forwarded in a diagonal front as shown by dotted lines in FIG. 7. Accordingly, inside the cylindrical container 35, all of the kernels adhered with astringent skins are completely stirred at a high speed. The edge tools 34 contact one after another and thus remove the astringent skins. The astringent skins remaining on the kernels are completely removed by the scratching of each kernel when it transfers upwardly or by cutting by the edge tools when such kernels come down again. And the astringent skins removed from the kernels transfer with the rotating wire netting 33 and they are vigorously discharged in direction of rotation of the wire netting from the gap between the wire netting and the cylindrical container 35. Thereafter these skins are collected to one place by an absorption device provided around the wire netting 33.

The cylindrical container 35 moves intermittently on the wire netting 33, during the period it passes on the wire netting 33, said operation is repeated, therefore, when the kernels reach the receiving plate 41, the astringent skins have been completely removed from the kernels. The next stopped position after having passed on the wire netting 33 is above the discharge passage 42. From the bottom of the container the kernels removed of the astringent skins are discharged into the discharge passage 42. Subsequent intermittent driving forwards said container below the material feed device 13, thus one cycle of removing the astringent skins is completed. Such operation is carried out also in another cylindrical container 35, and the kernels adhered with the astringent skins are treated one after another. Actually, the r.p.m. of the disc, the amount of kernels charged, the treating period, the size of mesh (of the wire netting) and the shape of the mesh becomes important. Incidentally, in this embodiment, the r.p.m. of the wire netting disc is 600 r.p.m., the period of passing over the wire netting disc of the cylindrical container is 15 seconds, the diameter of the cylindrical container is 100 mm., the amount of peanuts charged in each cylindrical container is about 100, and 60 kg. can be treated in 1 hour.

The present invention is explained with reference to an embodiment hereinabove, however, it goes without saying that the present invention is not limited to such an embodiment only, but change of design without departing from the spirit of the present invention is possible. For instance moving the peeling board from right to left, making the container a polygon, making the transfer directions of the peeling board and the container the same, or making the container stop on the peeling board for a certain period of time and then causing the container to leave would all be possible modifications.

We claim:

1. A machine for automatically removing astringent skins from peanuts comprising a disc-shaped transferrable peeling board rotatable along a horizontal surface around a perpendicular axis fixed at the center of said board, said board having wire netting with edge tools located on the upper part of each wire thereof; cylindrical containers having openings in the bottoms thereof and adapted to proceed at regular intervals onto said board in a direction opposite to the direction of rotation of said board and to leave from said board after proceeding approximately halfway around said perpendicular axis; a peanut feed device disposed in the vicinity of said peeling board, said containers being driven intermittently such that when each of said containers stops immediately below said feed device, peanut kernels adhered with astringent skins are fed thereto in a predetermined amount; and a receiving plate positioned between said feed device and said peeling board, the upper surface of said receiving plate being retained at approximately the same height as the surface of said wire netting of said peeling board, whereby peanut kernels adhered with astringent skins are accommodated and retained in each of said containers.